(12) United States Patent
Hosoya et al.

(10) Patent No.: US 9,593,251 B2
(45) Date of Patent: Mar. 14, 2017

(54) NON-AQUEOUS PIGMENT INK

(71) Applicant: RISO KAGAKU CORPORATION, Tokyo (JP)

(72) Inventors: Tetsuo Hosoya, Ibaraki (JP); Toshihiro Endo, Ibaraki (JP); Naofumi Ezaki, Ibaraki (JP); Shinichiro Shimura, Ibaraki (JP); Naoyuki Torita, Ibaraki (JP); Marie Morinaga, Ibaraki (JP)

(73) Assignee: RISO KAGAKU CORPORATION, Tokyo (JP)

( * ) Notice: Subject to any disclaimer, the term of this patent is extended or adjusted under 35 U.S.C. 154(b) by 0 days.

(21) Appl. No.: 15/157,804

(22) Filed: May 18, 2016

(65) Prior Publication Data
US 2016/0264806 A1   Sep. 15, 2016

Related U.S. Application Data

(62) Division of application No. 13/933,973, filed on Jul. 2, 2013, now Pat. No. 9,365,736.

(30) Foreign Application Priority Data

Jul. 5, 2012 (JP) ................................ 2012-151614

(51) Int. Cl.
C09D 11/36 (2014.01)
C09D 11/10 (2014.01)
C09D 11/326 (2014.01)
C09D 133/10 (2006.01)

(52) U.S. Cl.
CPC .............. C09D 11/36 (2013.01); C09D 11/10 (2013.01); C09D 11/326 (2013.01); C09D 133/10 (2013.01)

(58) Field of Classification Search
CPC .... C09D 11/36; C09D 133/10; C09D 11/326; C09D 11/10
See application file for complete search history.

(56) References Cited

U.S. PATENT DOCUMENTS

| 7,767,013 B2 | 8/2010 | Uozumi et al. |
| 2005/0245634 A1 | 11/2005 | Soutar et al. |
| 2007/0251413 A1 | 11/2007 | Hiroki et al. |
| 2008/0011192 A1* | 1/2008 | Uozumi ................ C09D 11/36 106/31.75 |
| 2011/0046298 A1 | 2/2011 | Hosoya et al. |
| 2013/0102704 A1* | 4/2013 | Shimizu ............... C09D 11/36 523/468 |
| 2013/0209695 A1* | 8/2013 | Fukagawa ........... C09D 133/08 427/379 |

FOREIGN PATENT DOCUMENTS

| CN | 101104759 | 1/2008 |
| CN | 102015924 | 4/2011 |
| JP | 63-012602 | 1/1988 |
| JP | 63-020303 | 1/1988 |
| JP | 2008-019333 | 1/2008 |
| JP | 2010-001452 | 1/2010 |
| JP | 2012-046595 | 3/2012 |

OTHER PUBLICATIONS

An Office Action; "The first Notice of Grounds for Rejection," issued by the Chinese Patent Office on Jun. 11, 2014, which corresponds to Chinese Patent Application No. 201310282303.2 and is related to U.S. Appl. No. 13/933,973; with English language partial translation.
Japanese Office Action issued with respect to application No. 2012-151614, mail date is Mar. 29, 2016.
An Office Action; "Second Notice of Grounds for Rejection," issued by the Chinese Patent Office on Feb. 10, 2015, which corresponds to Chinese Patent Application No. 201310282303.2 and is related to U.S. Appl. No. 13/933,973; with English language partial translation.

* cited by examiner

Primary Examiner — Alexander Kollias
(74) Attorney, Agent, or Firm — Greenblum & Bernstein, P.L.C.

(57) ABSTRACT

A non-aqueous pigment ink includes a pigment, a non-aqueous solvent, a non-water-soluble resin and a water-soluble resin, wherein the non-water-soluble resin is an acrylic polymer formed by a copolymer of a monomer mixture containing at least an alkyl (meth)acrylate (A) having a C8 to C18 alkyl group and a monomer (B) having a β-diketone group or β-keto acid ester group.

12 Claims, No Drawings

NON-AQUEOUS PIGMENT INK

The present application is a divisional of U.S. application Ser. No. 13/933,973, filed Jul. 2, 2013, which claims priority to Japanese Application No. 2012-151614 filed Jul. 5, 2012. The disclosure of U.S. application Ser. No. 13/933,973 is incorporated by reference herein in their entireties.

BACKGROUND OF THE INVENTION

Field of the Invention

The present invention relates to a non-aqueous pigment ink that is suitable for use with an inkjet recording device, and in particular to a non-aqueous pigment ink that is capable of contributing to power saving, and capable of reducing or eliminating print-through (striking-through), thereby achieving high print density.

Description of the Related Art

An inkjet recording system ejects a highly fluid inkjet ink as an ink particle from a very thin head nozzle to record an image on a recording medium, which is positioned to face the nozzle. Because of low noise and ability of high-speed printing, the inkjet recording systems are rapidly becoming widely used in recent years. As inks for use with the inkjet recording systems, so-called non-aqueous pigment inks, which are formed by finely dispersing a pigment in a non-water-soluble solvent, are known.

In recent years, in view of resource environment and energy saving, it is desired to reduce the power consumption of devices, such as printers, as low as possible, and there are ever increasing demands for power-efficient deices for power saving in the field of inkjet printing.

In inkjet recording devices, ink in an ink chamber provided in an inkjet head is ejected from a nozzle when a pressure is applied to the ink chamber. The ink ejected from the nozzle flies with leaving a tail behind it, and there is a time difference and a velocity difference between the leading part and the trailing part of the flying ink. In a low temperature environment, viscosity of the ink increases, and therefore it is necessary to apply a higher driving voltage to the inkjet head for ejecting a desired amount of ink, resulting in increased power consumption. Further, the ink ejection with the higher driving voltage tends to form satellites. The satellites are deposited on a recording medium and degrade the print quality. In order to ensure the print quality, conventionally, in a low temperature environment where the satellites are likely to be formed, a recording operation is started after a so-called warming-up operation to warm the inkjet head is performed.

That is, in a low temperature environment where the satellites are likely to be formed, the recording operation is started after the warming-up operation, and therefore electric power for the warming-up operation is also consumed. Further, the longer the time required for the warming-up operation, the longer the time taken for recording an image. This is a problem not only in view of the electric power but also in view of the operation time of the user. To address this problem from the ink side, it is effective for power saving to reduce the ink viscosity in a low temperature environment. To this end, it is very effective to provide an ink with lower viscosity. The ink viscosity can be reduced by reducing the amount of colorant, or the amount of powder, in the ink. However, this results in lower print density, and thus lower image quality.

For example, an ink using a colorant which is formed by combining a pigment, a dispersant, and a water-soluble resin including two or more primary and/or secondary amino groups in a molecule, which react with reactive functional groups of the dispersant and are chemically-bound to the dispersant, has been proposed in U.S. Pat. No. 7,767,013 (hereinafter, Patent Document 1). This ink has high storage stability, high pigment dispersibility, and high ejection stability with no clogging in the nozzle. A dispersant, in general, stabilizes an ink by repeating adsorption and desorption onto and from the surface of a pigment to achieve an equilibrium state. With the colorant disclosed in Patent Document 1, however, it is necessary to increase the amount of the dispersant to stabilize the ink in a low temperature environment, and it is difficult to reduce the viscosity to a level where the satellites are reduced or eliminated.

Therefore, with the ink of Patent Document 1, it is necessary to warm the ink to reduce the ink viscosity, and there still is the problem of increased power consumption. In particular, in the case where the ink is used with a circulation-type inkjet recording device, the volume of ink to be warmed is larger. This results in higher electric power consumption and longer time taken for warming, and thus longer time taken for outputting the first print. On the other hand, in order to reduce the viscosity, it is necessary to reduce the amount of the dispersant. In this case, however, it is difficult to ensure the pigment dispersion stability.

Use of a hydrocarbon-based non-polar solvent with high boiling point and low viscosity (which will hereinafter be simply referred to as "hydrocarbon-based non-polar solvent") can provide an ink with low viscosity. When the hydrocarbon-based non-polar solvent is used as an ink solvent, the polarity of the ink solvent is changed, and this may result in poorer pigment dispersion stability. However, it is believed that this problem can be solved by changing the structure of the dispersant. The applicant has proposed, in U.S. Patent Application Publication No. 2011/0046298 (hereinafter, Patent Document 2), a non-aqueous pigment ink containing non-water-soluble resin dispersing particulates, which are capable of dispersing a pigment.

SUMMARY OF THE INVENTION

However, when the non-water-soluble resin dispersing particulates disclosed in Patent Document 2 are dispersed in a hydrocarbon-based non-polar solvent, functional groups (urethane groups) to be adsorbed onto the pigment are oriented inward and alkyl groups having high affinity to the hydrocarbon-based non-polar solvent are oriented outward, and the non-water-soluble resin dispersing particulates are not easily adsorbed onto the pigment. Therefore, the pigment dispersibility cannot be ensured when the amount of the non-water-soluble resin dispersing particulates is small. It is therefore necessary to prescribe a sufficiently large amount of the non-water-soluble resin dispersing particulates relative to the pigment, and this results in higher ink viscosity. On the other hand, to ensure the pigment dispersibility, the hydrocarbon-based non-polar solvent needs to have good affinity to the pigment. However, if the affinity is excessively high, the hydrocarbon-based non-polar solvent tends to drag the pigment into a recording medium when it penetrates into the recording medium. This results in lower print density and higher tendency of print-through.

That is, in order to provide an ink with low viscosity, it is better to use a smaller amount of the dispersant. To this end, it is necessary that the dispersant is dissolved in the non-aqueous solvent, rather than in the particle form where the groups to be adsorbed onto the pigment are oriented inward. Further, as described above, while the pigment dispersant repeats adsorption and desorption onto and from the surface of the pigment to achieve the equilibrium state to stabilize the ink system, stabilization of the ink system can be achieved with a smaller amount of pigment dispersant if the pigment dispersant can be immobilized onto the surface of the pigment.

Further, while the water-soluble resin disclosed in Patent Document 1 can stabilize the ink system, it has been found that an ink obtained by mixing the water-soluble resin in the non-water-soluble resin dispersing particulates disclosed in Patent Document 2 has high wetting property to a nozzle plate used in an inkjet head, and this may cause the ink ejected from the nozzle to be deviated, or the ink to be not ejected from the nozzle. Further, the ink adhering to the nozzle plate may be transferred onto a printing paper sheet, or the like, to contaminate the print.

In view of the above-described circumstances, the present invention is directed to providing a non-aqueous pigment ink which achieves low ink viscosity to contribute to power saving, has good storage stability (pigment dispersion stability) and can reduce or eliminate the print-through at the same time, thereby achieving high print density.

An aspect of the non-aqueous pigment ink of the invention is a non-aqueous pigment ink including a pigment, a non-aqueous solvent, a non-water-soluble resin and a water-soluble resin, wherein the non-water-soluble resin is an acrylic polymer formed by a copolymer of a monomer mixture containing at least an alkyl (meth)acrylate (A) having a C8 to C18 alkyl group and a monomer (B) having a β-diketone group or β-keto acid ester group.

The non-water-soluble resin herein refers to a resin with a solubility in water of 23° C. is 0.5 mass % or less at 20° C.

It is preferable that the acrylic polymer has a comb-shaped structure having urethane groups as side chains to the main chain of the acrylic polymer.

It is preferable that the water-soluble resin is a polyethylene imine having a mass average molecular weight in the range from 200 to 2000, or a modified polyethylene imine obtained through addition reaction between the polyethylene imine and one of an acrylate or a vinyl compound, where a ratio of the acrylate or the vinyl compound to the polyethylene imine is not less than 0.3 molar equivalent and less than 1 molar equivalent to the total amine number of the polyethylene imine of 1 molar equivalent.

It is preferable that the content of the acrylic polymer is in the range from 0.1 to 1.0 in mass ratio relative to the pigment.

It is preferable that the content of the acrylic polymer is in the range from 0.1 to 20 in mass ratio relative to the water-soluble resin.

It is preferable that the content of the water-soluble resin is in the range from 0.01 to 0.5 in mass ratio relative to the pigment.

The non-aqueous pigment ink of the invention is a non-aqueous pigment ink including a pigment, a non-aqueous solvent, a non-water-soluble resin and a water-soluble resin, where the non-water-soluble resin is an acrylic polymer formed by a copolymer of a monomer mixture containing at least an alkyl (meth)acrylate (A) having a C8 to C18 alkyl group and a monomer (B) having a β-diketone group or β-keto acid ester group. Therefore, an ink with low viscosity can be provided, which allows ensuring the low temperature suitability and the pigment dispersion stability and reducing or eliminating the print-through at the same time, thereby achieving high print density.

Therefore, the non-aqueous pigment ink of the invention is preferably usable as an inkjet ink. Further, the non-aqueous pigment ink of the invention has low ink viscosity even in a low temperature environment, and is preferably usable, in particular, with circulation-type inkjet recording devices, which take longer time and more electric power for warming-up.

In the case where the water-soluble resin is a modified polyethylene imine obtained through an addition reaction between the polyethylene imine and one of an acrylate and a vinyl compound, where the ratio of the acrylate or the vinyl compound to the polyethylene imine is not less than 0.3 molar equivalent and less than 1 molar equivalent to the total amine number of the polyethylene imine of 1 molar equivalent, a sufficiently high effect of improving print density is provided, although the effect is slightly smaller than that of the case where the polyethylene imine is used, and an effect of increasing ink repellency from the nozzle plate is further provided, since the active hydrogen of —N—H of the amino group is alkylated (—N—R) to reduce affinity to the nozzle plate. Therefore, such a situation that the ink ejected from the nozzle is deviated or the ink is not ejected from the nozzle is reduced even without frequent wiping, and it is less likely that the ink adhering to the nozzle plate is transferred onto a printing paper sheet, or the like, to contaminate the print.

DESCRIPTION OF THE PREFERRED EMBODIMENTS

A non-aqueous pigment ink (which may hereinafter simply be referred to as "ink") of the invention contains a pigment, a non-aqueous solvent, a non-water-soluble resin and a water-soluble resin.

The non-water-soluble resin is an acrylic polymer formed by a copolymer of a monomer mixture containing at least an alkyl (meth)acrylate (A) having a C8 to C18 alkyl group and a monomer (B) having a β-diketone group or β-keto acid ester group.

The C8 to C18 alkyl group of the functional group of (A) is highly compatible with a hydrocarbon-based non-polar solvent of the non-aqueous solvent, which will be described later, thereby providing the dissolved state in the non-aqueous solvent. The β-diketone group or β-keto acid ester group, which is the functional group of (B), serves to reduce the ink viscosity to improve the low temperature suitability. Further, reducing the increase of viscosity contributes to electrostatic aggregation and fixing of the ink when the ink lands on a recording medium, and the improvement of print density and the reduction or elimination of print-through are achieved as a result.

If the carbon number of the alkyl group is 19 or more, the non-water-soluble resin tends to be solidified at low temperature and the low temperature suitability is impaired. On the other hand, if the carbon number of the alkyl group is 7 or less, the compatibility with the hydrocarbon-based non-polar solvent decreases and the stable pigment dispersion cannot be achieved, resulting in poorer storage stability and higher ink viscosity. In a low temperature environment, the ink viscosity becomes even higher, and the low temperature suitability is impaired. It is more desirable that the alkyl group is a C12 to C18 alkyl group.

The C8 to C18 alkyl group forming the functional group may be linear or branched. Specific examples thereof include octyl group, nonyl group, decyl group, dodecyl group, tridecyl group, tetradecyl group, pentadecyl group, hexadecyl group, heptadecyl group and octadecyl group, and two or more species thereof may be included.

With respect to the β-diketone group or β-keto acid ester group forming the functional group, preferred examples of the β-diketone group include acetoacetyl group and propion acetyl group, and preferred examples of the β-keto acid ester group include acetoacetoxy group and propion acetoxy group.

The molecular weight (mass average molecular weight) of the acrylic polymer is not particularly limited. However, if the ink of the invention is used as an inkjet ink, the molecular weight is preferably in the range from about 5,000 to about 50,000, and more preferably in the range from about 10,000 to about 30,000 in view of ejectability of the ink.

The glass-transition temperature (Tg) of the acrylic polymer is preferably not higher than room temperature, and more preferably 0° C. or less. With the glass-transition temperature in this range, film formation can be promoted at the room temperature when the ink is fixed on a recording medium.

The alkyl (meth)acrylate (A) is an alkyl (meth)acrylate including a C8 to C18 alkyl group, and forms the main chain of the acrylic polymer together with the monomer (B), where the alkyl group forms a functional group of the main chain. Preferred examples of the alkyl (meth)acrylate (A) include palmityl/stearyl methacrylate (C16/C18), cetyl acrylate (C16), dodecyl methacrylate (C12), dodecyl acrylate (C12), 2-ethylhexyl methacrylate (C8) and 2-ethylhexyl acrylate (C8), which may be used singly or in an appropriate combination.

The monomer (B) is a (meth)acrylate or (meth)acrylamide including the β-diketone group or β-keto acid ester group, and forms the main chain of the acrylic polymer together with the alkyl (meth)acrylate (A), where the β-diketone group or β-keto acid ester group forms a functional group of the main chain. The monomer (B) serves to reduce the ink viscosity to further improve the low temperature suitability. Further, reducing the increase of viscosity contributes to electrostatic aggregation and fixing of the ink when the ink lands on a recording medium, and the improvement of print density and the reduction or elimination of print-through are achieved as a result.

Preferred examples of the monomer (B) include a (meth)acrylate and a (meth)acrylamide which include the β-diketone group or β-keto acid ester group in the ester chain. More specific examples of the monomer (B) include: acetoacetoxy alkyl (meth)acrylates, such as acetoacetoxy ethyl (meth)acrylate; and acetoacetoxy alkyl (meth)acrylamides, such as hexadione (meth)acrylate and acetoacetoxy ethyl (meth)acrylamide, which may be used singly or in combination of two or more species.

The content of the alkyl (meth)acrylate (A) in the above-described monomer mixture (the alkyl (meth)acrylate (A) and the monomer (B)) is preferably 30 mass % or more, more preferably in the range from 40 to 95 mass %, and even more preferably in the range from 50 to 90 mass %. The content of the monomer (B) in the above-described monomer mixture is preferably in the range from 3 to 30 mass %, and more preferably in the range from 5 to 20 mass %.

Copolymerization of the above-described monomers can easily be achieved by known radical copolymerization. The reaction system may preferably be solution polymerization or dispersion polymerization. In this case, in order to achieve the molecular weight of the acrylic polymer within the above-described preferred range after the polymerization, it is effective to use a chain transfer agent in combination during the polymerization. Examples of the chain transfer agent include thiols, such as n-butyl mercaptan, lauryl mercaptan, stearyl mercaptan and cyclohexyl mercaptan.

As a polymerization initiator, a known thermal polymerization initiator, such as an azo compound (such as AIBN (azobisisobutyronitrile)) or a peroxidize (such as t-butyl peroxybenzoate, t-butyl peroxy-2-ethylhexanoate (PERBUTYL O, available from NOF Corporation)) may be used. As another example, a photopolymerization initiator, which generates radicals when exposed to an active energy ray, may be used. As a polymerization solvent used for the solution polymerization, a petroleum solvent (aroma-free (AF)), etc., may be used. As the polymerization solvent, it is preferable to select one or more of solvents which are usable as the non-aqueous solvent in the ink (which will be described later). For the polymerization reaction, other agents usually used in polymerization, such as a polymerization inhibitor, a polymerization promoter, a dispersant, etc., may be added to the reaction system.

The acrylic polymer in the invention preferably has a comb-shaped structure including urethane groups as side chains to the main chain of the acrylic polymer formed by the alkyl (meth)acrylate (A) and the monomer (B). The C8 to C18 alkyl group of the alkyl (meth)acrylate (A) serves to improve affinity to the hydrocarbon-based non-polar solvent of the non-aqueous solvent, which will be described later, to ensure the solubility in the solvent. On the other hand, the side chains formed by urethane groups serve to adsorb onto the pigment to improve the storage stability.

Introduction of the urethane groups of the side chains can be achieved by using a (meth)acrylate having functional groups capable of reacting with amino groups in addition to the alkyl (meth)acrylate (A) and the monomer (B), i.e., through a reaction among the functional groups capable of reacting with amino groups, an amino alcohol and a polyvalent isocyanate compound, which will be described later. Preferred examples of the functional groups capable of reacting with amino groups include a glycidyl group, a vinyl group and a (meth)acryloyl group.

An example of the (meth)acrylate including a glycidyl group is glycidyl (meth)acrylate, and preferred examples of the (meth)acrylate including a vinyl group include vinyl (meth)acrylate and 2-(2-vinyloxyethoxy)ethyl (meth)acrylate. Examples of the (meth)acrylate including a (meth) acryloyl group include dipropylene glycol di(meth)acrylate and 1,6-hexanediol di(meth)acrylate. The (meth)acrylate may include two or more species. It should be noted that the (meth)acrylate having functional groups capable of reacting with amino groups may be also used in a case where the urethane groups are not introduced.

As the amino alcohol reacts with and binds to the functional groups capable of reacting with amino groups, and an addition reaction between a hydroxy group of the amino alcohol and an isocyanate group ($R^1N{=}C{=}O$) of the polyvalent isocyanate compound occurs as shown below, the urethane groups (urethane bonds) (carbamates: $R^1NHCOOR$) are introduced.

$$R^1N{=}C{=}O + R{-}OH \rightarrow ROCONHR^1$$

where R— represents an amino alcohol moiety bound to the functional group of the copolymer.

In this manner, the urethane groups serving as pigment adsorbing groups are introduced.

Examples of the amino alcohol include monomethyl ethanolamine, diethanolamine and diisopropanolamine. Among them, dialkanolamine (secondary alkanolamine) represented by the general formula: $(HOR)_2NH$ (where R is a divalent hydrocarbon group), which has two hydroxy groups, is preferable since the number of formed urethane groups is increased. These amino alcohols may be used in combination of two or more species.

In the case where the urethane groups are introduced, the amount of the amino alcohol to be reacted is preferably 0.05 to 1 molar equivalent, and more preferably 0.1 to 1 molar equivalent relative to the functional groups capable of reacting with amino groups, of the (meth)acrylate, in view of the introduction of the urethane groups. When the amount of the amino alcohol is less than 1 molar equivalent, unreacted functional groups of the (meth)acrylate having functional groups capable of reacting with amino groups are left. However, it is believed that the unreacted functional groups serve as pigment adsorbing groups.

Examples of the polyvalent isocyanate compound include aliphatic, alicyclic and aromatic compounds, such as 1,6-diisocyanate hexane, 1,3-bis(isocyanatomethyl)benzene, 1,3-bis(isocyanatomethyl)cyclohexane and 1,5-naphthalene diisocyanate, which may be used in combination of two or more species. The amount of the polyvalent isocyanate compound to be reacted is preferably almost equivalent (0.98 to 1.02 molar equivalent) to hydroxy groups included in prepared raw materials, so that no unreacted raw materials are left when the urethane groups are introduced through the reaction with the hydroxy groups.

The mass ratio between the copolymer moieties and the introduced urethane group moieties of the acrylic polymer is preferably in the range from 80:20 to 99:1, and more preferably in the range from 85:15 to 95:5. The mass of the copolymer moieties of the acrylic polymer refers to the total mass of the monomers used in the copolymerization, and the mass of the introduced urethane group moieties refers to the total mass of the amino alcohol and the polyvalent isocyanate compound used in the reaction. The urethane group moieties have high pigment adsorption capacity. However, although one might expect that a higher mass ratio of the urethane group moieties results in a higher pigment adsorption rate, a mass ratio of the urethane group moieties higher than 20 results in poorer compatibility with the solvent and the amount of free non-water-soluble resin is increased, resulting in lower pigment adsorption rate.

The content of the acrylic polymer relative to the total amount of the ink is preferably 0.1 mass % or more, and more preferably 1 mass % or more, in view of ensuring the pigment dispersibility. If the content of the acrylic polymer is excessively high, the ink viscosity is increased, and storage stability in a high temperature environment may be impaired. Therefore, the content of the acrylic polymer is preferably not more than 20 mass %, and more preferably not more than 10 mass %. That is, the content of the acrylic polymer relative to the total amount of the ink is preferably in the range from 1 to 10 mass %, and more preferably in the range from 2 to 8 mass %.

The content of the acrylic polymer relative to the pigment is preferably in the range from 0.1 to 1.0 in mass ratio relative to the pigment in view of ensuring the storage stability. If the content of the acrylic polymer relative to the pigment is excessively low, i.e., less than 0.1 in mass ratio, or excessively high, i.e., more than 1.0 in mass ratio, it is difficult to ensure the storage stability.

The content of the acrylic polymer relative to the water-soluble resin is preferably in the range from 0.1 to 20 in mass ratio, and more preferably in the range from 0.4 to 10 in mass ratio. If the content of the acrylic polymer relative to the water-soluble resin is excessively low, i.e., less than 0.1 in mass ratio, or excessively high, i.e., more than 20 in mass ratio, it is difficult to ensure the storage stability.

The mass of the resin (the total amount of the acrylic polymer and the water-soluble resin) relative to the mass of the pigment is preferably 0.2 or more relative to the mass of pigment of 1, in view of ensuring the pigment dispersing effect, and preferably not more than 1.5 in view of improving the ink viscosity and avoiding defective ejection due to temporal change.

The content of the water-soluble resin is preferably in the range from 0.01 to 0.5, more preferably in the range from 0.05 to 0.3, and most preferably in the range from 0.1 to 0.2 in mass ratio relative to the pigment.

The content of the water-soluble resin relative to the total amount of the ink is preferably in the range from about 0.1 to about 5 mass %, and more preferably in the range from 0.5 to 1.5 mass %.

Examples of the water-soluble resin include basic polymeric electrolytes, such as polyethyleneimine (PEI), polyvinylamine and polyvinylpyridine, and derivatives thereof. In particular, a polyethylene imine having a mass average molecular weight in the range from 200 to 2,000, or a modified polyethylene imine obtained through addition reaction between a polyethylene imine having a mass average molecular weight in the range from 200 to 2,000 and one of an acrylate or a vinyl compound is preferably usable. The modified polyethylene imine is preferably one where the ratio of the acrylate or the vinyl compound is not less than 0.3 molar equivalent and less than 1 molar equivalent relative to the total amine number of the polyethylene imine of 1 molar equivalent (which may hereinafter be simply referred to as "modified polyethylene imine"). The amine number here is calculated by finding an amine number (KOH mg/g) according to "(2) Indicator titration method" of JIS K-7237-1995 (Testing method for total amine numbers of amine-based hardeners of epoxy resins) and converting the found amine number using the molecular weight of 56.11 mg/mmol of KOH.

If the mass average molecular weight of the polyethylene imine is less than 200, effect of obtaining high density on plain paper is low. On the other hand, if the mass average molecular weight of the polyethylene imine is 2000 or more, the storage stability may be impaired depending on the storage environment. The mass average molecular weight of the polyethylene imine is more preferably in the range from 300 to 1800, in view of obtaining high density, and a pour point of −5° C. or less to ensure good storage stability in a low temperature environment.

As the polyethylene imine, a commercially available polyethylene imine may be used, and preferred examples thereof include: SP-006, SP-012, SP-018 and SP-200 available from Nippon Shokubai Co., Ltd.; and Lupasol FG, Lupasol G20 Waterfree, Lupasol PR8515 available from BASF.

In the modified polyethylene imine, the acrylate and the vinyl compound may be used in combination. In this case, the ratio of the acrylate and the vinyl compound is not less than 0.3 molar equivalent relative to the amine number the polyethylene imine of 1 molar equivalent. If the ratio of the acrylate and the vinyl compound is less than 0.3 molar equivalent, the effect of improving ink repellency from the nozzle plate is weakened.

The mechanism of improvement of the ink repellency from the nozzle plate by using the modified polyethylene imine is estimated as follows. Imino groups or amino groups (—NH, —NH$_2$) present in an ink using polyethylene imine tend to adhere to the nozzle plate of the inkjet head. By using the modified polyethylene imine obtained by adding the acrylate or vinyl compound to the imino group or amino group of the polyethylene imine through the Michael addition reaction, the ink repellency is increased and the wetting property to the nozzle plate is improved.

Preferred examples of the acrylate include methyl acrylate, ethyl acrylate, t-butyl acrylate, n-butyl acrylate and 2-ethylhexyl acrylate.

Preferred examples of the vinyl compound include acrylonitrile, vinyl halides, such as vinyl chloride and vinyl fluoride, and vinyl acetate.

The modified polyethylene imine can be obtained by adding the acrylate or vinyl compound to the imino group or amino group of the polyethylene imine through Michael addition. Specifically, the modified polyethylene imine can be prepared by dripping the polyethylene imine and the acrylate or the vinyl compound in diethanolamine heated to 50° C. to 60° C. with stirring, and then maintaining the temperature of 50° C. to 60° C. for 1 to 3 hours.

Even when the acrylic polymer does not have a functional group with high pigment adsorption capacity, such as the urethane group, strong pigment adsorption capacity can be provided when the acrylic polymer having the β-diketone group or β-keto acid ester group is used in combination with the water-soluble resin. It is estimated that interaction among the β-diketone group or β-keto acid ester group of the non-water-soluble resin, the polar group of the water-soluble resin and the pigment stabilizes the pigment dispersion. The interaction among the β-diketone group or β-keto acid ester group, the polar group of the water-soluble resin and the pigment reduces desorption of the non-water-soluble resin from the pigment, thereby allowing further reduction of the amount of the non-water-soluble resin to be used. As a result, the low ink viscosity is achieved while ensuring the pigment dispersion stability, thereby achieving more excellent low temperature suitability.

The acrylic polymer having the comb-shaped structure including urethane groups as side chains has high pigment adsorption capacity due to the urethane groups. However, if the mass ratio of the urethane groups is excessively high, compatibility with the solvent is impaired and the pigment adsorption rate decreases, resulting in increase of the amount of free non-water-soluble resin, and thus increase of the ink viscosity. However, in the case where the acrylic polymer having the comb-shaped structure including urethane groups as side chains further has the β-diketone group or β-keto acid ester group, interaction with the pigment can be enhanced by using the water-soluble resin in combination, and the amount of free non-water-soluble resin can be reduced to achieve the low ink viscosity.

Further, while the affinity of the non-aqueous solvent to the hydrocarbon-based non-polar solvent is improved by the C8 to C18 alkyl group of the acrylic polymer to ensure the solubility in the solvent, if the affinity of the non-aqueous solvent to the pigment is excessively high, the non-aqueous solvent tends to drag the pigment into a recording medium when it penetrates into the recording medium. By combining the acrylic polymer with the water-soluble resin, the pigment dispersion stability is ensured even when the amount of the acrylic polymer is reduced. This allows reducing the amount of the acrylic polymer, thereby reducing the penetration of the pigment. As a result, the print-through is reduced or eliminated, and the high print density is achieved.

As the non-aqueous solvent, a hydrocarbon-based non-polar solvent or polar solvent may be used, which may be used singly or in an appropriate combination of two or more species. In view of providing the low viscosity, it is preferable to use a hydrocarbon-based non-polar solvent.

The content of the hydrocarbon-based non-polar solvent is preferably 20 mass % or more, more preferably 50 mass % or more, and even more preferably 80 mass % or more relative to the total mass of the ink solvent. If the content of the hydrocarbon-based non-polar solvent is less than 50 mass % relative to the total amount of the solvent, it may be difficult to provide sufficiently low viscosity of the ink depending on the environment in which the ink is used.

When the content of the hydrocarbon-based non-polar solvent is 50 mass % or more relative to the total amount of the ink solvent, even lower ink viscosity and further improvement of the storage stability are achieved. With the content of the hydrocarbon-based non-polar solvent being 50 mass % or more relative to the total amount of the ink solvent, almost no free water-soluble resin and non-water-soluble resin are present in the ink solvent, and the resins gather in the vicinity of the pigment and are strongly adsorbed onto the surface of the pigment. Therefore, it is estimated that the effect of reducing the ink viscosity is provided not only by the reduction of the viscosity of the solvent itself but also by the reduction of the amount of free resins in the solvent, and further improvement of the pigment dispersion stability can be achieved.

Preferred examples of the hydrocarbon-based non-polar solvent include an aliphatic hydrocarbon solvent, an alicyclic hydrocarbon-based solvent and an aromatic hydrocarbon solvent. Preferred examples of the aliphatic hydrocarbon solvent and the alicyclic hydrocarbon-based solvent include: TECLEAN N-16, TECLEAN N-20, TECLEAN N-22, NISSEKI NAPHTESOL L, NISSEKI NAPHTESOL M, NISSEKI NAPHTESOL H, NO. 0 SOLVENT L, NO. 0 SOLVENT M, NO. 0 SOLVENT H, NISSEKI ISOSOL 300, NISSEKI ISOSOL 400, AF-4, AF-5, AF-6 and AF-7 available from JX Nippon Oil & Energy Corporation; and Isopar G, Isopar H, Isopar L, Isopar M, Exxsol D40, Exxsol D80, Exxsol D100, Exxsol D130, and Exxsol D140 available from Exxon. Preferred examples of the aromatic hydrocarbon solvent include NISSEKI CLEANSOL G (alkyl benzene) available from JX Nippon Oil & Energy Corporation, and SOLVESSO 200 available from Exxon.

As the above-described polar solvent, polar solvents such as an ester solvent, an alcohol solvent, a higher fatty acid solvent, or an ether solvent may be used. More specifically, an ester solvent with a carbon number in a molecule of 14 or more, such as methyl laurate, isopropyl laurate, hexyl laurate, isopropyl myristate, isopropyl palmitate, isostearyl palmitate, methyl oleate, ethyl oleate, isopropyl oleate, butyl oleate, methyl linoleate, isobutyl linoleate, ethyl linoleate, isopropyl isostearate, soybean oil methyl ester, soybean oil isobutyl ester, tall oil methyl ester, tall oil isobutyl ester, diisopropyl adipate, diisopropyl sebacate, diethyl sebacate, propylene glycol monocaprate, trimethylol propane tri-2-ethylhexanoate, glyceryl tri-2-ethylhexanoate, etc.; an alcohol solvent with a carbon number in a molecule of 12 or more, such as isomyristyl alcohol, isopalmityl alcohol, isostearyl alcohol, oleyl alcohol, etc.; a higher fatty acid solvent, such as isononanoic acid, isomyristic acid, hexadecane acid, isopalmitic acid, oleic acid, isostearic acid, etc.; or an ether solvent, such as diethylglycol monobutylether, ethylene glycol monobutylether, propylene glycol monobutylether, propylene glycol dibutylether, etc., may preferably used. These non-aqueous solvents may be used singly or in combination of two or more species.

Examples of the pigment include: carbon blacks, such as Furnace Black, Lamp Black, Acetylene Black, Channel Black, etc.; metals or metal oxides, such as copper, iron, titanium oxide, etc.; and organic pigments, such as Ortho Nitro Aniline Black, etc. These pigments may be used singly or in an appropriate combination. Examples of the pigments for color inks include Watching Red, Toluidine Red, Permanent Carmine FB, Disazo Orange PMP, Lake Red C, Brilliant Carmine 6B, Quinacridone Red, Dioxane Violet, Orthonitro Aniline Orange, Dinitro Aniline Orange, Vulcan Orange, Toluidine Red, Chlorinated Para Red, Brilliant Fast Scarlet, Naphthol Red 23, Pyrazolone Red, Barium Red 2B, Calcium Red 2B, Strontium Red 2B, Manganese Red 2B, Barium Lithol Red, Pigment Scarlet 3B Lake, Lake Bordeaux 10B, Anthocin 3B Lake, Anthocin 5B Lake, Rhodamine 6G Lake, Eosin Lake, Iron Oxide Red, Naphthol Red FGR, Rhodamine B Lake, Methyl Violet Lake, Dioxazine Violet, Naphthol Carmine FB, Naphthol Red M, Fast Yellow AAA, Fast Yellow 10G, Disazo Yellow AAMX, Disazo Yellow AAOT, Disazo Yellow AAOA, Disazo Yellow HR, Isoindoline Yellow, Fast Yellow G, Disazo Yellow AAA, Phthalocyanine Blue, Victoria Pure Blue, Basic Blue 5B Lake, Basic Blue 6G Lake, Fast Sky Blue, Alkali Blue R Toner, Peacock Blue Lake, Iron Blue, Ultramarine, Reflex Blue 2G, Reflex Blue R, Alkali Blue G Toner, Brilliant Green Lake, Diamond Green Thioflavin Lake, Phthalocyanine Green G, Green Gold, Phthalocyanine Green Y, purple oxide, zinc oxide, titanium oxide, calcium carbonate, clay, barium sulfate, alumina white, aluminum powder, bronze powder, daylight fluorescent pigments, pearl pigments, etc. These pigments may be used singly or in an appropriate combination.

The content of the pigment in the ink is usually in the range from 0.01 to 20 mass %. In view of the print density and the ink viscosity, the content of the pigment in the ink is preferably in the range from 1 to 15 mass %, and more preferably in the range from 5 to 10 mass %.

Besides the above-described components, the ink of the invention may include conventional additives. Examples of the additives may include a surfactant, such as an anionic, cationic, amphoteric or nonionic surfactant, an antioxidant, such as dibutylhydroxytoluene, propyl gallate, tocopherol, butylhydroxyanisol or nordihydroguaiaretic acid, etc.

For an ink for use with an inkjet recording system, a suitable range of the ink viscosity varies depending on the nozzle diameter of the ejection head, the ejection environment, etc; however, in general, it is preferably in the range from 5 to 30 mPa·s at 23° C., more preferably in the range from 5 to 15 mPa·s, and an ink viscosity of about 10 mPa·s at 23° C. is suitable for use with an inkjet recording device. The ink viscosity herein refers to a value of the ink viscosity under a shear stress of 10 Pa when the shear stress is increased from 0 Pa at a rate of 0.1 Pa/s at 23° C.

The ink of the invention can be prepared by mixing the pigment, the non-water-soluble resin, the non-aqueous solvent and the water-soluble resin, dispersing the pigment using a dispersing means, such as a ball mill or a bead mill, and filtering the mixture, as desired, using a known filter, such as a membrane filter. It should be noted that, in the case where a polyethylene imine is used as the water-soluble resin, which is often slightly soluble or hardly-soluble in commonly-used non-aqueous solvents, it is desirable to use a device that is capable of applying shear, such as a bead mill, to achieve mixing under shear. If the water-soluble resin used is soluble in the non-aqueous solvent used, such shearing is not necessary; however, it is preferable to achieve mixing while stirring.

The average particle size of the pigment in the resulting ink is preferably about 500 nm or less, more preferably 200 nm or less, and even more preferably 150 nm or less. In order to reduce or eliminate the print-through, the average particle size is preferably about 50 nm or more. The average particle size of the pigment is a value measured using a dynamic light-scattering particle size distribution measuring device, LB-500, available from HORIBA, Ltd.

EXAMPLES

Hereinafter, examples of the non-aqueous inkjet ink of the invention are shown.

Synthesis of Resin Solutions a to d

In a 300-ml four-necked flask, 75 g of AF-7 (naphthenic solvent, available from JX Nippon Oil & Energy Corporation) was put, and the temperature was raised to 110° C. while introducing nitrogen gas and stirring. Then, while maintaining the temperature of 110° C., a mixture of 16.7 g of AF-7 and 2 g of PERBUTYL 0 (t-butylperoxy-2-ethylhexanoate, available from NOF Corporation) was dripped over three hours into each monomer mixture according to the composition shown in Table 1. Then, while maintaining the temperature of 110° C., 0.2 g of PERBUTYL O was added one hour later and two hours later, respectively. The mixtures were left to mature at 110° C. for one hour, and then were diluted with 10.6 g of AF-7 to obtain colorless and transparent resin solutions a to d with a non-volatile content of 50%. The resulting resin solutions had mass average molecular weights in the range from 20,000 to 23,000 (measured according to the GPC method, converted into standard polystyrene).

Synthesis of Resin Solution e

In a 500-ml four-necked flask, a monomer mixture according to the composition e shown in Table 1 was mixed. Further, 1.29 g of V-65 (available from Wako Pure Chemical Industries, Ltd.) serving as the polymerization initiator, 0.97 g of stearyl mercaptan (available from Wako Pure Chemical Industries, Ltd.) serving as the chain transfer agent, and 260.2 g of AF7 (AF SOLVENT NO. 7, which is a naphthenic solvent available from JX Nippon Oil & Energy Corporation) were added to the mixture, and the mixture was reacted for five hours under reflux at 61±3° C. to obtain a resin solution e (with a solid content of 25%). After the reaction, a trace amount of methoquinone (p-methoxyphenol) serving as the polymerization inhibitor was added. The resulting resin solution had a mass average molecular weight of 21800 (measured according to the GPC method, converted into standard polystyrene).

TABLE 1

| Resin Solution | | | a | b | c | d | e |
|---|---|---|---|---|---|---|---|
| Monomer Mixture | VMA (C22) | Behenyl methacrylate (NOF Corporation) | | | | 50 | 32.1 |
| | PSMA (C16/C18) | Palmityl/stearyl methacrylate (Kao Corporation) | 50 | 50 | 50 | | |
| | LMA (C12) | Dodecyl methacrylate (Kao Corporation) | 20 | 35 | 35 | | 57.9 |
| | EHMA (C8) | 2-ethylhexyl methacrylate (Mitsubishi Chemical Corporation) | | | 35 | | |
| | AAEM | Acetoacetoxy ethylmethacrylate (The Nippon Synthetic Chemical Industry Co., Ltd.) | 15 | 15 | | | |
| | GMA | Glycidyl methacrylate (NOF Corporation) | 15 | | 15 | 15 | 5 |
| | DM | Dimethyl aminoethyl-methacrylate (Wako Pure Chemical Industries, Ltd.) | | | | | 5 |

Synthesis of Resin Solutions D1 and D2

In a 500-mL four-necked flask, 200 g of the resin solution a (with a solid content of 50% in the AF-7 solvent), 4.0 g of a Michael adduct (diethanolamine/2-ethylhexyl acrylate adduct), and 2.8 g of diethanolamine (available from Nippon Shokubai Co., Ltd.) were put, and the temperature was raised to 110° C. while introducing nitrogen gas and stirring. Then, a reaction between the glycidyl group of the resin solution a and diethanolamine was completed by maintaining the temperature of 110° C. for one hour. Then, 0.2 g of dibutyl tin dilaurate was added, and a mixture of 7.8 g of TAKENATE 600 (1,3-bis(isocyanatomethyl) cyclohexane, available from Mitsui Chemicals Polyurethanes, Inc.) and 72.0 g of EXEPARL HL (hexyl laurate, available from Kao Corporation) was dripped over one hour. After the dripping, the temperature was raised to 120° C. to have the mixture react for six hours, and then the mixture was cooled to obtain a resin solution D1 with a solid content of 40%.

Similarly, a resin solution D2 was prepared according to the composition shown in Table 2. The resulting acrylic polymers had mass average molecular weights in the range from 22,000 to 26,000 (measured according to the GPC method, converted into standard polystyrene).

TABLE 2

| | | | Resin Solution | |
|---|---|---|---|---|
| Long-Chain Alkyl Group (Carbon Number) | | | D1 C16/18/12 | D2 C22/8 |
| Main Chain | Resin solution a | Solid content 50% | 200.0 | 0.0 |
| | Resin solution d | Solid content 50% | 0.0 | 200.0 |
| Side Chains | | Michael adduct (diethanolamine/2-ethylhexyl acrylate adduct) | 4.0 | 4.0 |
| | | Diethanolamine | 2.8 | 2.8 |
| | | Diisocyanate | 7.8 | 7.8 |
| Diluting Solvent | AF-7 | Naphthenic solvent (JX Nippon Oil & Energy Corporation) | 0.0 | 0.0 |
| | HL | Hexyl laurate (Kao Corporation) | 72.0 | 72.0 |
| | Total | | 286.6 | 286.6 |
| | Resin Solid Content | | 40.0 | 40.0 |
| | Main Chain/Side Chain Ratio | | 87/13 | 87/13 |

Preparation of Modified Polyethylene Imines

In a 300-ml four-necked flask, 50 g of EPOMIN SP-006 (polyethylene imine having a molecular weight of 600, available from Nippon Shokubai Co., Ltd.) was put, and the temperature was raised to 60° C. while stirring. Then, 13.27 g of acrylonitrile (available from Wako Pure Chemical Industries, Ltd.) was dripped over about 30 minutes. After the dripping, the temperature of 60° C. was maintained for two hours to complete a Michael addition reaction to obtain a modified polyethylene imine PEI-3. Similarly, modified polyethylene imines PEI-4 to PEI-12 according to the formulations shown in Table 3 were prepared. The value of Michael addition equivalent shown in Table 3 means, in the case of PEI-3 where 1 g of polyethylene imine (SP-006) contains 20 mmol of amino group, that a vinyl compound of 20 mmol×0.5 molar equivalent=10 mmol was reacted.

TABLE 3

| Polyethylene Imine Compound | | | PEI-1 | PEI-2 | PEI-3 | PEI-4 | PEI-5 | PEI-6 | PEI-7 | PEI-8 | PEI-9 | PEI-10 | PEI-11 | PEI-12 |
|---|---|---|---|---|---|---|---|---|---|---|---|---|---|---|
| Michael Addition Ratio (Molar Equivalent) | | | un-modified | un-modified | 0.25 | 0.25 | 0.25 | 0.5 | 0.5 | 0.5 | 0.75 | 0.75 | 0.98 | 0.98 |
| Polyethylene Imine | SP-006 | Molecular weight 600 (available from Nippon Shokubai, Amine number: 20 mmol/g, solid) | 50 | | 50 | 50 | | 50 | 50 | | 50 | 50 | 50 | 50 |
| | SP-012 | Molecular weight 1200 (available from Nippon Shokubai, Amine number: 19 mmol/g, solid) | | 50 | | | 50 | | | 50 | | | | |
| Vinyl Compound | | Acrylonitrile | | | 13.27 | | 12.60 | 26.53 | | 25.20 | 39.80 | | 52.00 | |
| | Acrylate | Butyl acrylate | | | | 32.05 | | | 64.10 | | | 96.15 | | 125.64 |
| | | Total | 50 | 50 | 63.27 | 82.05 | 62.60 | 76.53 | 114.10 | 75.20 | 89.80 | 146.15 | 102.00 | 175.64 |

Preparation of Ink 4 g of the resulting resin solution a, 1.5 g of polyethylene imine (SP-012, available from Nippon Shokubai Co., Ltd.), 10 g of a pigment (carbon black, MA100, available from Mitsubishi Chemical Corporation), 17.25 g of AF-7 and 17.25 g of hexyl laurate were mixed, and zirconia beads (with a diameter of 0.5 mm) were put in the mixture to disperse the mixture for 120 minutes using a rocking mill (available from Seiwa Giken Co., Ltd.) After the dispersion, the zirconia beads were removed, and 25 g of AF-7 and 25 g of EXEPARL HL were added to dilute the mixture. Then, the diluted mixture was filtered using a 3-μm membrane filter and a 0.8-μm membrane filter in this order to remove dusts and coarse particles to obtain an ink sample of Example 1.

Similarly, ink samples of the other examples and comparative examples according to the compositions shown in Tables 4 to 8 were obtained in the same manner as in the above-described Example 1.

An average dispersed particle size of the pigment and an ink viscosity of each of the resulting ink samples were measured. The average dispersed particle size of the pigment was measured using a dynamic light-scattering particle size distribution measuring device, LB-500, available from HORIBA, Ltd. The ink viscosity was a viscosity under a shear stress of 10 Pa when the shear stress was increased from 0 Pa at a rate of 0.1 Pa/s at 23° C., and was measured using a stress-controlled rheometer, RS75 (with a cone angle of 1° and a diameter of 60 mm), available from Haake.

Evaluation Methods
Print Density

Each of the resulting ink samples was charged in a printer, HC5500 (available from Riso Kagaku Corporation), to print a solid image on plain paper (RISO printing paper (thin type), available from Riso Kagaku Corporation). Then, OD values at front and back sides of the resulting prints were measured using an optical densitometer (RD920, available from Macbeth), and evaluated according to the following criteria. A higher front side OD value indicates higher image density, and a lower back side OD value indicates lower level of print-through.

Print Density (Front Side OD)
S: 1.20 or more;
A: 1.15 or more and less than 1.20;
B: 1.10 or more and less than 1.15;
C: 1.05 or more and less than 1.10; and
D: less than 1.05.

Print Density (Back Side OD)
S: not more than 0.20;
A: more than 0.20 and not more than 0.25;
B: more than 0.25 and not more than 0.30; and
C: more than 0.30.

Storage Stability of Ink (70° C.)

Each ink sample was put in an airtight container and was left for four weeks in the environment of 70° C. Thereafter, a change of the ink viscosity and a change of the average dispersed particle size of the pigment of each ink sample were measured, and the results of measurement were evaluated according to the following criteria. The viscosity and the average dispersed particle size of the pigment of each sample after being left for four weeks were measured in the manners as described above.

The change rate of the viscosity was calculated as follows:

[(Viscosity after four weeks×100)/(Initial value of viscosity)]−100(%).

The change rate of the average dispersed particle size of the pigment was calculated as follows:

[(Average dispersed particle size after four weeks× 100)/(Initial value of average dispersed particle size)]−100(%).

S: both the change rate of the viscosity and the change rate of the average dispersed particle size of the pigment were smaller than ±3%;

A: one of the change rate of the viscosity and the change rate of the average dispersed particle size of the pigment was ±3% or greater and smaller than ±5%;

B: one of the change rate of the viscosity and the change rate of the average dispersed particle size of the pigment was ±5% or greater and smaller than ±10%; and C: one of the change rate of the viscosity and the change rate of the average dispersed particle size of the pigment was ±10% or greater.

Low Temperature Suitability

The resulting ink samples were left for four weeks at −5° C., and then, the ink viscosity of each ink sample at −5° C. was measured and evaluated according to the following criteria.

A: less than 50 mPa·s;
B: 50 mPa·s or more and less than 100 mPa·s; and
C: 100 mPa·s or more.

Ejection Stability

The ink samples were put in an airtight state and left for one month in the environment of 70° C. Thereafter, using each ink sample, 100 prints of a solid image (318 dots in the main scanning direction and 3000 dots in the sub-scanning direction) were successively printed with an inkjet head (CF1) available from Toshiba Tec Corporation, and the printed images were visually checked and evaluated according to the following criteria.

A: uniform solid images were obtained;
B: uniform solid image were obtained at the early stage, and images with defects were obtained after several tens of prints; and
C: images with defects were obtained from the early stage.

Satellites

Using each ink sample, printing on A4 paper sheets was performed with a printer, ORPHIS-X (available from Riso Kagaku Corporation), under printing conditions of a head gap of 3 mm, an environment temperature of 15° C., a printing speed of 120 ppm and a resolution of 300 dpi*300 dpi with 1-6 drop (6 pl/drop), and the resulting prints were evaluated according to the following criteria.

A: almost no satellites were observed;
B: satellites were slightly observed; and
C: a significant level of satellites were observed.

Wetting Property to Nozzle Plate

Each inkjet ink sample was put in a 30-ml container, and one end of a nozzle plate (with a length of 5 cm and a width of 5 mm), which is for use with an inkjet printer, HC5500 (available from Riso Kagaku Corporation), was picked up with tweezers to immerse the other end portion of 2 cm of the nozzle plate into the ink. In this state, the nozzle plate and the ink sample was left for a week in the environment of 60° C., and the wetting property of each ink sample was evaluated. The nozzle plate was quickly lifted out of the ink sample, and a time taken for the film of ink left on the nozzle plate to form ink droplets without wiping was measured ten times. An average value of the measured times was calculated as an ink repelling time, and was evaluated according to the following criteria. It should be noted that the nozzle plate used was formed by a base material of a polyimide film with the surface thereof coated with a fluorine resin.

S: the time taken for the ink sample to form ink droplets was less than 3.5 seconds;
A: the time taken for the ink sample to form ink droplets was 3.5 seconds or more and less than 1 minute; and
B: the time taken for the ink sample to form ink droplets was 1 minute or more.

The results of the above-described evaluations are shown in Tables 4 to 8 together with the formulation of each ink.

TABLE 4

|  |  |  | Example 1 | Example 2 | Example 3 | Example 4 | Example 5 | Example 6 | Example 7 |
|---|---|---|---|---|---|---|---|---|---|
|  | Mass Ratio of Non-Polar Solvent/Solvent in the Ink (%) |  | 51 | 51 | 51 | 51 | 51 | 52 | 56 |
|  | Mass Ratio of Non-Water-Soluble Resin/Water-Soluble Resin |  | 1.33 | 1.33 | 1.33 | 10.0 | 0.44 | 2.67 | 6.67 |
|  | Mass Ratio of Non-Water-Soluble Resin/Pigment |  | 0.2 | 0.2 | 0.2 | 0.2 | 0.2 | 0.4 | 1.0 |
|  | Mass Ratio of Water-Soluble Resin/Pigment |  | 0.15 | 0.15 | 0.15 | 0.02 | 0.45 | 0.15 | 0.15 |
|  | Mass Ratio of (Non-Water-Soluble Resin + Water-Soluble Resin)/Pigment |  | 0.35 | 0.35 | 0.35 | 0.215 | 0.65 | 0.65 | 1.15 |
| Pigment | MA100 | Carbon black (Mitsubishi Chemical Corporation) | 10.0 | 10.0 | 10.0 | 10.0 | 10.0 | 10.0 | 10.0 |
| Non-Water-Soluble Resin | Resin solution a | Solid content 50% | 4.0 | 4.0 | 4.0 | 4.0 | 4.0 | 8.0 | 20.0 |
|  | Resin solution b | Solid content 50% |  |  |  |  |  |  |  |
|  | Resin solution c | Solid content 50% |  |  |  |  |  |  |  |
|  | Resin solution d | Solid content 50% |  |  |  |  |  |  |  |
|  | Resin solution e | Solid content 25% |  |  |  |  |  |  |  |
|  | Resin solution D1 | Solid content 40% |  |  |  |  |  |  |  |
|  | Resin solution D2 | Solid content 40% |  |  |  |  |  |  |  |
| Water-Soluble Resin (PEI) | SP-003 | Molecular weight about 300 (Nippon Shokubai) |  |  | 1.5 |  |  |  |  |
|  | SP-012 | Molecular weight about 1200 (Nippon Shokubai) | 1.5 |  |  | 0.2 | 4.5 | 1.5 | 1.5 |
|  | SP-018 | Molecular weight about 1800 (Nippon Shokubai) |  | 1.5 |  |  |  |  |  |
| Diluent For Dispersion | AF-7 (non-polar solvent) | Naphthenic solvent (JX Nippon Oil & Energy Corporation) | 17.25 | 17.25 | 17.25 | 17.93 | 15.75 | 15.25 | 9.25 |
|  | HL (polar solvent) | Hexyl laurate (Kao Corporation) | 17.25 | 17.25 | 17.25 | 17.92 | 15.75 | 15.25 | 9.25 |
| Viscosity Adjusting Solvent | AF-7 (non-polar solvent) | Naphthenic solvent (JX Nippon Oil & Energy Corporation) | 25.0 | 25.0 | 25.0 | 25.0 | 25.0 | 25.0 | 25.0 |
|  | HL (polar solvent) | Hexyl laurate (Kao Corporation) | 25.0 | 25.0 | 25.0 | 25.0 | 25.0 | 25.0 | 25.0 |
|  | Total |  | 100.0 | 100.0 | 100.0 | 100.0 | 100.0 | 100.0 | 100.0 |
| Physical Properties Evaluation | Average particle size (nm) |  | 114 | 124 | 124 | 118 | 114 | 106 | 103 |
|  | Viscosity (mPa · s) |  | 9.3 | 9.6 | 9.5 | 9.3 | 10.3 | 10.5 | 10.9 |
|  | Print density (front side OD) |  | S | S | S | S | A | A | A |
|  | Print density (back side OD) |  | S | S | S | A | A | A | A |
|  | Storage stability |  | S | S | S | S | A | S | S |
|  | Low temperature suitability |  | A | A | A | A | A | A | A |
|  | Ejection stability |  | A | A | A | A | A | A | A |
|  | Satellites |  | A | A | A | A | A | A | A |

TABLE 5

|  |  |  | Example 8 | Example 9 | Example 10 | Example 11 | Example 12 | Example 13 | Example 14 | Example 15 |
|---|---|---|---|---|---|---|---|---|---|---|
|  | Mass Ratio of Non-Polar Solvent/Solvent in the Ink (%) |  | 100 | 80 | 20 | 2 | 51 | 52 | 51 | 50 |
|  | Mass Ratio of Non-Water-Soluble Resin/Water-Soluble Resin |  | 1.33 | 1.33 | 1.33 | 1.33 | 1.33 | 2.67 | 2.67 | 1.33 |
|  | Mass Ratio of Non-Water-Soluble Resin/Pigment |  | 0.2 | 0.2 | 0.2 | 0.2 | 0.2 | 0.4 | 0.4 | 0.2 |
|  | Mass Ratio of Water-Soluble Resin/Pigment |  | 0.15 | 0.15 | 0.15 | 0.15 | 0.15 | 0.15 | 0.15 | 0.15 |
|  | Mass Ratio of (Non-Water-Soluble Resin + Water-Soluble Resin)/Pigment |  | 0.35 | 0.35 | 0.35 | 0.35 | 0.35 | 0.55 | 0.55 | 0.35 |
| Pigment | MA100 | Carbon black (Mitsubishi Chemical Corporation) | 10.0 | 10.0 | 10.0 | 10.0 | 10.0 | 10.0 | 10.0 | 10.0 |

TABLE 5-continued

| | | | Example 8 | Example 9 | Example 10 | Example 11 | Example 12 | Example 13 | Example 14 | Example 15 |
|---|---|---|---|---|---|---|---|---|---|---|
| Non-Water-Soluble Resin | Resin solution a | Solid content 50% | 4.0 | 4.0 | 4.0 | 4.0 | | | | |
| | Resin solution b | Solid content 50% | | | | | | 4.0 | 8.0 | |
| | Resin solution c | Solid content 50% | | | | | | | | |
| | Resin solution d | Solid content 50% | | | | | | | | |
| | Resin solution e | Solid content 25% | | | | | | | | |
| | Resin solution D1 | Solid content 40% | | | | | | | 10.0 | 5.0 |
| | Resin solution D2 | Solid content 40% | | | | | | | | |
| Water-Soluble Resin (PEI) | SP-003 | Molecular weight about 300 (Nippon Shokubai) | | | | | | | | |
| | SP-012 | Molecular weight about 1200 (Nippon Shokubai) | 1.5 | 1.5 | 1.5 | 1.5 | 1.5 | 1.5 | 1.5 | 1.5 |
| | SP-018 | Molecular weight about 1800 (Nippon Shokubai) | | | | | | | | |
| Diluent for Dispersion | AF-7 (non-polar solvent) | Naphthenic solvent (JX Nippon Oil & Energy Corporation) | 34.50 | 25.60 | 4.90 | | 17.25 | 15.25 | 14.25 | 16.75 |
| | HL (polar solvent) | Hexyl laurate (Kao Corporation) | | 8.90 | 29.60 | 34.50 | 17.25 | 15.25 | 14.25 | 16.75 |
| Viscosity Adjusting Solvent | AF-7 (non-polar solvent) | Naphthenic solvent (JX Nippon Oil & Energy Corporation) | 50.0 | 40.0 | 10.0 | | 25.0 | 25.0 | 25.0 | 25.0 |
| | HL (polar solvent) | Hexyl laurate (Kao Corporation) | | 10.0 | 40.0 | 50.0 | 25.0 | 25.0 | 25.0 | 25.0 |
| | Total | | 100.0 | 100.0 | 100.0 | 100.0 | 100.0 | 100.0 | 100.0 | 100.0 |
| Physical Properties Evaluation | Average particle size (nm) | | 118 | 110 | 114 | 120 | 118 | 118 | 111 | 114 |
| | Viscosity (mPa · s) | | 8.3 | 8.8 | 9.8 | 10.5 | 9.1 | 9.1 | 9.7 | 9.3 |
| | Print density (front side OD) | | S | S | A | A | A | A | A | A |
| | Print density (back side OD) | | S | S | A | A | S | A | S | S |
| | Storage stability | | S | S | A | A | S | S | S | S |
| | Low temperature suitability | | A | A | A | A | A | A | A | A |
| | Ejection stability | | A | A | A | A | A | A | A | A |
| | Satellites | | A | A | A | A | A | A | A | A |

TABLE 6

| | | | Example 16 | Example 17 | Example 18 | Example 19 | Example 20 | Example 21 | Example 22 |
|---|---|---|---|---|---|---|---|---|---|
| Pigment | MA8 | Carbon black (Mitsubishi Chemical Corporation) | 10 | 10 | 10 | 10 | 10 | 10 | 10 |
| Pigment Dispersant | Resin solution D1 | Solid content 40% | 5 | 5 | 5 | 5 | 5 | 5 | 5 |
| Modified PEI | PEI-1 (unmodified PEI) | | | | | | | | |
| | PEI-2 (unmodified PEI) | | | | | | | | |
| | PEI-3 | | | | | | | | |
| | PEI-4 | | | | | | | | |
| | PEI-5 | | | | | | | | |
| | PEI-6 | | 1.5 | | | | | | |
| | PEI-7 | | | 1.5 | | | | | |
| | PEI-8 | | | | 1.5 | | | | |
| | PEI-9 | | | | | 1.5 | | | |
| | PEI-10 | | | | | | 1.5 | | |
| | PEI-11 | | | | | | | 1.5 | |
| | PEI-12 | | | | | | | | 1.5 |
| Diluent for Dispersion | AF-7 | Naphthenic solvent (JX Nippon Oil & Energy Corporation) | 16.75 | 16.75 | 16.75 | 16.75 | 16.75 | 16.75 | 16.75 |
| | HL | Hexyl laurate (Kao Corporation) | 16.75 | 16.75 | 16.75 | 16.75 | 16.75 | 16.75 | 16.75 |

TABLE 6-continued

|  |  |  | Example 16 | Example 17 | Example 18 | Example 19 | Example 20 | Example 21 | Example 22 |
|---|---|---|---|---|---|---|---|---|---|
| Viscosity Adjusting Solvent | AF-7 | Naphthenic solvent (JX Nippon Oil & Energy Corporation) | 30 | 30 | 30 | 30 | 30 | 30 | 30 |
|  | HL | Hexyl laurate (Kao Corporation) | 20 | 20 | 20 | 20 | 20 | 20 | 20 |
|  |  | Total | 100 | 100 | 100 | 100 | 100 | 100 | 100 |
| Physical Properties Evaluation |  | Average particle size (nm) | 124 | 128 | 136 | 118 | 114 | 124 | 130 |
|  |  | Viscosity (mPa · s) | 9.6 | 9.7 | 9.3 | 9.4 | 9.2 | 9.5 | 9.7 |
|  |  | Print density (front side OD) | A | A | A | A | A | A | A |
|  |  | Print density (back side OD) | A | A | A | A | A | A | A |
|  |  | Storage stability | A | A | A | A | A | A | A |
|  |  | Nozzle plate wetting property evaluation | S | S | S | S | S | S | S |
|  |  | Low temperature suitability | A | A | A | A | A | A | A |
|  |  | Ejection stability | A | A | A | A | A | A | A |
|  |  | Satellites | A | A | A | A | A | A | A |

TABLE 7

|  |  |  | Example 23 | Example 24 | Example 25 | Example 26 | Example 27 |
|---|---|---|---|---|---|---|---|
| Pigment | MA8 | Carbon black (Mitsubishi Chemical Corporation) | 10 | 10 | 10 | 10 | 10 |
| Pigment Dispersant | Resin solution D1 | Solid content 40% | 5 | 5 | 5 | 5 | 5 |
| Modified PEI | | PEI-1 (unmodified PEI) | 1.5 | | | | |
| | | PEI-2 (unmodified PEI) | | 1.5 | | | |
| | | PEI-3 | | | 1.5 | | |
| | | PEI-4 | | | | 1.5 | |
| | | PEI-5 | | | | | 1.5 |
| | | PEI-6 | | | | | |
| | | PEI-7 | | | | | |
| | | PEI-8 | | | | | |
| | | PEI-9 | | | | | |
| | | PEI-10 | | | | | |
| | | PEI-11 | | | | | |
| | | PEI-12 | | | | | |
| Diluent for Dispersion | AF-7 | Naphthenic solvent (JX Nippon Oil & Energy Corporation) | 16.75 | 16.75 | 16.75 | 16.75 | 16.75 |
| | HL | Hexyl laurate (Kao Corporation) | 16.75 | 16.75 | 16.75 | 16.75 | 16.75 |
| Viscosity Adjusting Solvent | AF-7 | Naphthenic solvent (JX Nippon Oil & Energy Corporation) | 30 | 30 | 30 | 30 | 30 |
| | HL | Hexyl laurate (Kao Corporation) | 20 | 20 | 20 | 20 | 20 |
| | | Total | 100 | 100 | 100 | 100 | 100 |
| Physical Properties Evaluation | | Average particle size (nm) | 107 | 112 | 104 | 108 | 122 |
| | | Viscosity (mPa · s) | 9.7 | 10.1 | 10.1 | 10.2 | 10.6 |
| | | Print density (front side OD) | A | A | A | A | A |
| | | Print density (back side OD) | A | A | A | A | A |
| | | Storage stability | A | A | A | A | A |
| | | Nozzle plate wetting property evaluation | B | B | A | A | A |
| | | Low temperature suitability | A | A | A | A | A |
| | | Ejection stability | A | A | A | A | A |
| | | Satellites | A | A | A | A | A |

TABLE 8

| | | | Comp. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|---|---|
| | Mass Ratio of Non-Polar Solvent/Solvent in the Ink (%) | | 51 | 50 | 51 | 50 | 57 | 54 | 52 |
| | Mass Ratio of Non-Water-Soluble Resin/Water-Soluble Resin | | — | — | — | — | 2.67 | 1.33 | — |
| | Mass Ratio of Non-Water-Soluble Resin/Pigment | | 0.4 | 0.2 | 0.4 | 0.2 | 0.4 | 0.2 | 0.4 |
| | Mass Ratio of Water-Soluble Resin/Pigment | | 0 | 0 | 0 | 0 | 0.15 | 0.15 | 0 |
| | Mass Ratio of (Non-Water-Soluble Resin + Water-Soluble Resin)/Pigment | | 0.4 | 0.2 | 0.4 | 0.2 | 0.4 | 0.2 | 0.4 |
| Pigment | MA100 | Carbon black (Mitsubishi Chemical Corporation) | 10.0 | 10.0 | 10.0 | 10.0 | 10.0 | 10.0 | 10.0 |
| Non-Water-Soluble Resin | Resin solution a | Solid content 50% | | | | | | | 8.0 |
| | Resin solution b | Solid content 50% | | | | | | | |
| | Resin solution c | Solid content 50% | | | | | | | |
| | Resin solution d | Solid content 50% | | | | | | | |
| | Resin solution e | Solid content 25% | | | | | 16.0 | 8.0 | |
| | Resin solution D1 | Solid content 40% | 10.0 | 5.0 | | | | | |
| | Resin solution D2 | Solid content 40% | | | 10.0 | 5.0 | | | |
| Water-Soluble Resin (PEI) | SP-003 | Molecular weight about 300 (Nippon Shokubai) | | | | | | | |
| | SP-012 | Molecular weight about 1200 (Nippon Shokubai) | | | | | 1.5 | 1.5 | |
| | SP-018 | Molecular weight about 1800 (Nippon Shokubai) | | | | | | | |
| Diluent for Dispersion | AF-7 (non-polar solvent) | Naphthenic solvent (JX Nippon Oil & Energy Corporation) | 15.00 | 17.50 | 15.00 | 17.50 | 11.25 | 15.25 | 16.00 |
| | HL (polar solvent) | Hexyl laurate (Kao Corporation) | 15.00 | 17.50 | 15.00 | 17.50 | 11.25 | 15.25 | 16.00 |
| Viscosity Adjusting Solvent | AF-7 (non-polar solvent) | Naphthenic solvent (JX Nippon Oil & Energy Corporation) | 25.0 | 25.0 | 25.0 | 25.0 | 25.0 | 25.0 | 25.0 |
| | HL (polar solvent) | Hexyl laurate (Kao Corporation) | 25.0 | 25.0 | 25.0 | 25.0 | 25.0 | 25.0 | 25.0 |
| | Total | | 100.0 | 100.0 | 100.0 | 100.0 | 100.0 | 100.0 | 100.0 |
| Physical Properties Evaluation | Average particle size (nm) | | 106 | 222 | 104 | Gelated | 106 | Gelated | 244 |
| | Viscosity (mPa·s) | | 9.2 | 18.9 | 13.2 | | 13.6 | | 22.6 |
| | Print density (front side OD) | | B | B | C | | B | | D |
| | Print density (back side OD) | | B | B | B | | B | | C |
| | Storage stability | | A | C | A | | A | | C |
| | Low temperature suitability | | A | C | C | | C | | C |
| | Ejection stability | | A | C | B | | B | | C |
| | Satellites | | A | C | C | | C | | C |

| | | | Comp. Ex. 8 | Comp. Ex. 9 | Comp. Ex. 10 | Comp. Ex. 11 | Comp. Ex. 12 | Comp. Ex. 13 |
|---|---|---|---|---|---|---|---|---|
| | Mass Ratio of Non-Polar Solvent/Solvent in the Ink (%) | | 52 | 52 | 52 | 57 | 52 | 52 |
| | Mass Ratio of Non-Water-Soluble Resin/Water-Soluble Resin | | — | — | — | — | 2.67 | 2.67 |
| | Mass Ratio of Non-Aqueous Resin/Pigment | | 0.4 | 0.4 | 0.4 | 0.4 | 0.4 | 0.4 |
| | Mass Ratio of Water-Soluble Resin/Pigment | | 0 | 0 | 0 | 0 | 0.15 | 0.15 |
| | Mass Ratio of (Non-Water-Soluble Resin + Water-Soluble Resin)/Pigment | | 0.4 | 0.4 | 0.4 | 0.4 | 0.55 | 0.55 |
| Pigment | MA100 | Carbon black (Mitsubishi Chemical Corporation) | 10.0 | 10.0 | 10.0 | 10.0 | 10.0 | 10.0 |
| Non-Water-Soluble Resin | Resin solution a | Solid content 50% | | | | | | |
| | Resin solution b | Solid content 50% | | 8.0 | | | | |
| | Resin solution c | Solid content 50% | | | 8.0 | | | 8.0 |

TABLE 8-continued

|  |  |  |  |  |  |  |  |  |
|---|---|---|---|---|---|---|---|---|
|  | Resin solution d | Solid content 50% |  |  | 8.0 |  | 8.0 |  |
|  | Resin solution e | Solid content 25% |  |  |  | 16.0 |  |  |
|  | Resin solution D1 | Solid content 40% |  |  |  |  |  |  |
|  | Resin solution D2 | Solid content 40% |  |  |  |  |  |  |
| Water-Soluble Resin (PEI) | SP-003 | Molecular weight about 300 (Nippon Shokubai) |  |  |  |  |  |  |
|  | SP-012 | Molecular weight about 1200 (Nippon Shokubai) |  |  |  |  | 1.5 | 1.5 |
|  | SP-018 | Molecular weight about 1800 (Nippon Shokubai) |  |  |  |  |  |  |
| Diluent for Dispersion | AF-7 (non-polar solvent) | Naphthenic solvent (JX Nippon Oil & Energy Corporation) | 16.00 | 16.00 | 16.00 | 12.00 | 15.25 | 15.25 |
|  | HL (polar solvent) | Hexyl laurate (Kao Corporation) | 16.00 | 16.00 | 16.00 | 12.00 | 15.25 | 15.25 |
| Viscosity Adjusting Solvent | AF-7 (non-polar solvent) | Naphthenic solvent (JX Nippon Oil & Energy Corporation) | 25.0 | 25.0 | 25.0 | 25.0 | 25.0 | 25.0 |
|  | HL (polar solvent) | Hexyl laurate (Kao Corporation) | 25.0 | 25.0 | 25.0 | 25.0 | 25.0 | 25.0 |
|  |  | Total | 100.0 | 100.0 | 100.0 | 100.0 | 100.0 | 100.0 |
| Physical Properties Evaluation |  | Average particle size (nm) | Gelated | Gelated | Gelated | 142 | 203 | 218 |
|  |  | Viscosity (mPa · s) |  |  |  | 14.1 | 33.3 | 38.8 |
|  |  | Print density (front side OD) |  |  |  | D | C | C |
|  |  | Print density (back side OD) |  |  |  | C | B | B |
|  |  | Storage stability |  |  |  | B | C | C |
|  |  | Low temperature suitability |  |  |  | C | C | C |
|  |  | Ejection stability |  |  |  | C | C | C |
|  |  | Satellites |  |  |  | C | C | C |

As shown in Tables 4 and 5, among the ink samples of Examples 1 to 15, the ink samples of Examples 1 to 13 contained an acrylic polymer formed by a copolymer of a monomer mixture including an alkyl (meth)acrylate (A) and a monomer (B), and the ink samples of Examples 14 and 15 contained an acrylic polymer having a comb-shaped structure having urethane groups as side chains to the main chain of the acrylic polymer. It can be seen from Tables 4 and 5 that all the ink samples of Examples 1 to 15 had the values of the viscosity and the average dispersed particle size of the pigment within the appropriate ranges for inkjet inks, and had excellent low temperature suitability and storage stability while achieving reduction or elimination of print-through and high print density. Even when the mass ratio of the non-water-soluble resin (solid content) relative to the pigment was as low as 20%, stabile pigment dispersion was achieved and penetration of the pigment was reduced to reduce the print-through, thereby achieving high print density. Further, when a non-water-soluble resin and a water-soluble resin were used in combination, more improved low temperature suitability was obtained.

In contrast, the ink samples of Comparative Examples 1 to 4 and Comparative Examples 7 to 11 shown in Table 8 did not contain a water-soluble resin. In Comparative Example 1, the pigment dispersion stability was ensured by the non-water-soluble resin, and therefore good storage stability, good low temperature suitability and good ejection stability were obtained and the satellites were reduced. However, since the non-aqueous solvent had high affinity to the pigment, the non-aqueous solvent dragged the pigment into the recording medium when the non-aqueous solvent penetrated into the recording medium, and this resulted in the print-through and decrease of the print density. In Comparative Example 2, the mass ratio of the non-water-soluble resin relative to the pigment was half the mass ratio of the non-water-soluble resin in Comparative Example 1, and this resulted in poor pigment dispersion stability. With respect to Comparative Examples 7 and 8, which had no side chains of urethane groups, the ink sample of Comparative Example 7 had poor pigment dispersion stability, and the pigment was not dispersed in the ink sample of Comparative Example 8. In Comparative Examples 9 and 10, which did not contain the non-water-soluble resin of the invention, the pigment was not dispersed. In Comparative Example 11, where the content of the non-water-soluble resin was doubled, the pigment was dispersed; however, the ink sample of Comparative Example 11 had poor stability and resulted in low print density.

In Comparative Example 3, where the carbon numbers of the alkyl groups forming the functional groups of the non-water-soluble resin were 22 and 8, the long carbon chains of the alkyl groups served to ensure the storage stability; however, the non-water-soluble resin tended to be solidified in a low temperature environment and resulted in poor low temperature suitability, and the satellites were not reduced. In Comparative Example 4, where the content of the non-water-soluble resin was small, the pigment was not dispersed.

Comparative Examples 5 and 6 were the cases where the water-soluble resin was contained, but the non-water-soluble resin did not have a β-diketone group or β-keto acid ester group. In Comparative Example 5, while the high mass ratio of the non-water-soluble resin relative to the pigment provided the pigment dispersibility even without the β-diketone group or β-keto acid ester group, the viscosity was increased and this resulted in poor low temperature suitability and poor ejection stability. Further, when compared to the ink samples of the examples of the invention, the pigment adsorption was insufficient because of the absence of the β-diketone group or β-keto acid ester group, and the ink sample of Comparative Example 5 failed to reduce the print-through and resulted in low print density. In Comparative Example 6, the mass ratio of the non-water-soluble was half the mass ratio of the non-water-soluble in Comparative Example 5. In this case, the pigment adsorption was not achieved and the pigment was not dispersed.

The ink samples of Comparative Examples 12 and 13 contained a water-soluble resin which was an acrylic polymer that did not have a β-diketone group or β-keto acid ester group, and resulted in poor image quality, low print density and poor stability in a low temperature environment.

As can be seen from the examples of the invention, the combined use of the β-diketone group or β-keto acid ester group of the non-water-soluble resin and the water-soluble resin allows reducing the viscosity while ensuring the pigment dispersion stability even when the amount of the non-water-soluble resin is small, thereby providing excellent low temperature suitability of the ink. Further, the water-soluble resin ensures the pigment dispersion stability, and this allows reducing the amount of the non-water-soluble resin to be used, thereby reducing the penetration of the pigment. As a result, the reduction or elimination of the print-through is achieved and the high print density is achieved.

On the other hand, as shown in Tables 6 and 7, the ink samples of Examples 16 to 22 allowed ensuring the low temperature suitability and the pigment dispersion stability and reducing the print-through at the same time, and achieved high print density. The ink samples of Examples 16 to 22 also had high ink repellency and resulted in improved wetting property to the nozzle plate.

In Examples 23 and 24, where the polyethylene imine was unmodified, the ink repellency from the nozzle plate without wiping was insufficient. In examples 25 to 27, where the ratio of the modified polyethylene imine was less than 0.3 equivalent, the ink repellency from the nozzle plate without wiping was insufficient.

As described above, the non-aqueous pigment ink of the invention ensures the low temperature suitability and the pigment dispersion stability, and reduces or eliminates the print-through at the same time, thereby achieving the high print density. Therefore, the non-aqueous pigment ink of the invention is preferably usable as an inkjet ink. Further, the non-aqueous pigment ink of the invention has low ink viscosity even in a low temperature environment, and is therefore preferably usable, in particular, with circulation-type inkjet recording devices, which require longer time and more electric power for warming-up.

What is claimed is:

1. A non-aqueous pigment ink comprising:
   a pigment;
   a non-aqueous solvent;
   a non-water-soluble resin; and
   a water-soluble resin;
   wherein the non-water-soluble resin is an acrylic polymer formed by a copolymer of a monomer mixture containing at least an alkyl (meth)acrylate (A) having a $C_8$ to $C_{18}$ alkyl group and a monomer (B) having a β-diketone group or β-keto acid ester group; and
   the acrylic polymer does not include a urethane group.

2. The non-aqueous pigment ink as claimed in claim 1, wherein the water-soluble resin is a polyethylene imine having a mass average molecular weight of from 200 to 2000.

3. The non-aqueous pigment ink as claimed in claim 1, wherein a content of the water-soluble resin is from 0.01 to 0.5 in mass ratio relative to the pigment.

4. The non-aqueous pigment ink as claimed in claim 1, wherein a content of the acrylic polymer is from 0.1 to 1.0 in mass ratio relative to the pigment.

5. The non-aqueous pigment ink as claimed in claim 1, wherein a content of the acrylic polymer is from 0.1 to 20 in mass ratio relative to the water-soluble resin.

6. The non-aqueous pigment ink as claimed in claim 1, wherein the monomer (B) has a β-diketone group.

7. The non-aqueous pigment ink as claimed in claim 6, wherein the β-diketone group is an acetoacetyl group or a propion acetyl group.

8. The non-aqueous pigment ink as claimed in claim 1, wherein the monomer (B) has a β-keto acid ester group.

9. The non-aqueous pigment ink as claimed in claim 8, wherein the β-keto acid ester group is an acetoacetoxy group or a propion acetoxy group.

10. The non-aqueous pigment ink as claimed in claim 1, wherein the content of the alkyl (meth)acrylate (A) having a $C_8$ to $C_{18}$ alkyl group in the monomer mixture is 30 mass % or more.

11. The non-aqueous pigment ink as claimed in claim 1, wherein the content of the monomer (B) having a β-diketone group or β-keto acid ester group in the monomer mixture is from 3 mass % to 30 mass %.

12. The non-aqueous pigment ink as claimed in claim 1, wherein the content of the alkyl (meth)acrylate (A) having a $C_8$ to $C_{18}$ alkyl group in the monomer mixture is from 50 mass % to 90 mass %, and the content of the monomer (B) having a β-diketone group or β-keto acid ester group in the monomer mixture is from 5 mass % to 20 mass %.

* * * * *